US011079964B2

(12) United States Patent
Wang et al.

(10) Patent No.: US 11,079,964 B2

(45) Date of Patent: Aug. 3, 2021

(54) MEMORY SYSTEM

(71) Applicant: TOSHIBA MEMORY CORPORATION, Tokyo (JP)

(72) Inventors: Jianan Wang, Kawasaki Kanagawa (JP); Kouichi Tashiro, Yokohama Kanagawa (JP); Kenji Kikuchi, Yokohama Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 98 days.

(21) Appl. No.: 16/391,606

(22) Filed: Apr. 23, 2019

(65) Prior Publication Data

US 2020/0019345 A1 Jan. 16, 2020

(30) Foreign Application Priority Data

Jul. 11, 2018 (JP) ............................ JP2018-131546

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 8,164,371 | B2 | 4/2012 | Monma | |
| 8,644,085 | B2 | 2/2014 | Kim et al. | |
| 8,730,757 | B2 | 5/2014 | Shimizu | |
| 9,369,118 | B2 | 6/2016 | Nakata | |
| 9,742,603 | B1 * | 8/2017 | Bandi | H04L 7/10 |
| 9,747,072 | B2 | 8/2017 | Noble et al. | |
| 2010/0156488 | A1 * | 6/2010 | Kim | H03K 5/1565<br>327/158 |
| 2013/0250693 | A1 * | 9/2013 | Shimizu | G11C 16/32<br>365/185.18 |
| 2016/0104520 | A1 * | 4/2016 | Kang | G11C 16/0483<br>365/233.1 |
| 2017/0364276 | A1 * | 12/2017 | Bhuiyan | G11C 7/222 |
| 2019/0080734 | A1 * | 3/2019 | Tsuji | H03L 7/08 |
| 2019/0109585 | A1 * | 4/2019 | Tang | H03K 5/1565 |

* cited by examiner

*Primary Examiner* — Denise Tran

(74) *Attorney, Agent, or Firm* — Foley & Lardner LLP

(57) ABSTRACT

A memory system may include a semiconductor memory and a memory controller. The memory controller may include an adjustment circuit configured to receive a first signal having a first duty cycle, and intermittently output a second signal to an outside of the memory controller on the basis of a control signal, the second signal having a second duty cycle which is different from the first duty cycle. The memory controller may further include a selector circuit configured to receive the second signal, receive a third signal which is generated on the basis of the second signal, and output a selected one of the second signal and the third signal. The memory controller may further include a control circuit configured to generate the control signal on the basis of the selected one of the second signal and the third signal output from the selector circuit.

20 Claims, 8 Drawing Sheets

| VALUE OF CORRECTION CODE | ADJUSTMENT AMOUNT OF DUTY CYCLE |
|---|---|
| 000 | A1 |
| 001 | A2 |
| 010 | A3 |
| 011 | A4 |
| 100 | A5 |
| 101 | A6 |
| 110 | A7 |
| 111 | A8 |

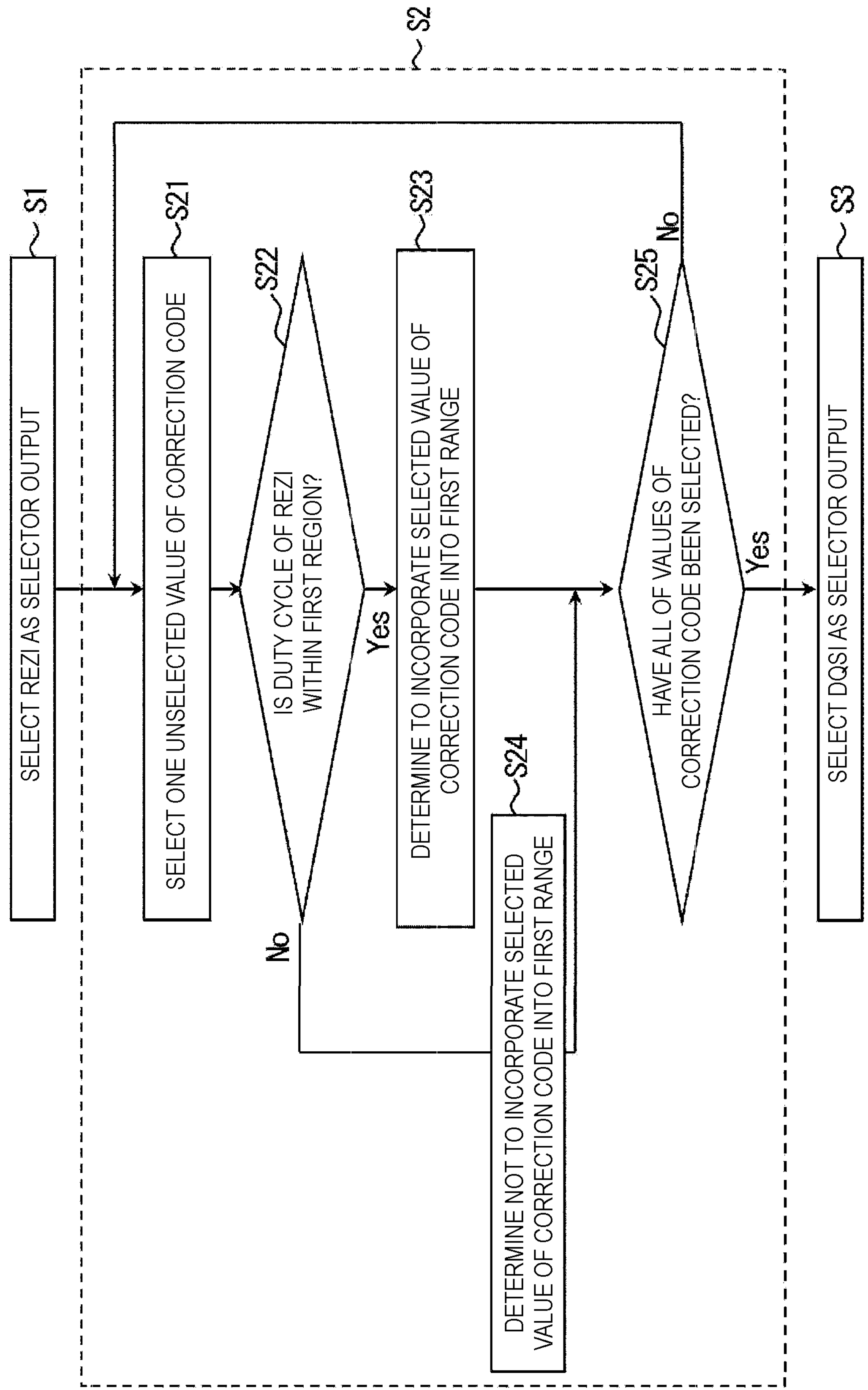
FIG. 5
S1
SELECT REZI AS SELECTOR OUTPUT
S2
S21
SELECT ONE UNSELECTED VALUE OF CORRECTION CODE
S22
IS DUTY CYCLE OF REZI WITHIN FIRST REGION?
Yes
No
S23
DETERMINE TO INCORPORATE SELECTED VALUE OF CORRECTION CODE INTO FIRST RANGE
S24
DETERMINE NOT TO INCORPORATE SELECTED VALUE OF CORRECTION CODE INTO FIRST RANGE
S25
HAVE ALL OF VALUES OF CORRECTION CODE BEEN SELECTED?
No
Yes
S3
SELECT DQSI AS SELECTOR OUTPUT

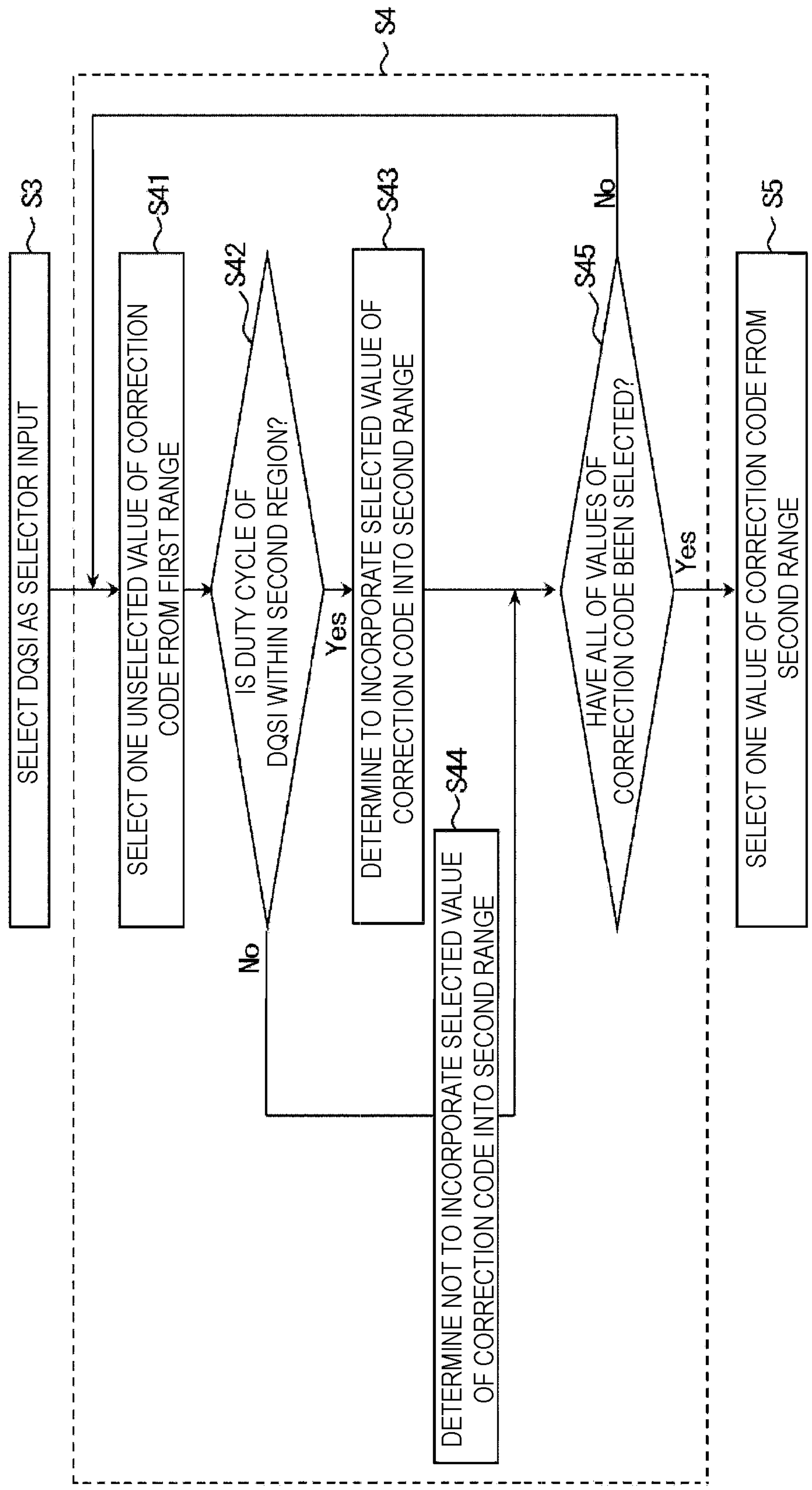
FIG. 6
S3
SELECT DQSI AS SELECTOR INPUT
S4
S41
SELECT ONE UNSELECTED VALUE OF CORRECTION CODE FROM FIRST RANGE
S42
IS DUTY CYCLE OF DQSI WITHIN SECOND REGION?
Yes
No
S43
DETERMINE TO INCORPORATE SELECTED VALUE OF CORRECTION CODE INTO SECOND RANGE
S44
DETERMINE NOT TO INCORPORATE SELECTED VALUE OF CORRECTION CODE INTO SECOND RANGE
S45
HAVE ALL OF VALUES OF CORRECTION CODE BEEN SELECTED?
No
Yes
S5
SELECT ONE VALUE OF CORRECTION CODE FROM SECOND RANGE VALUE OF CORRECTION CODE
ADJUSTMENT AMOUNT OF DUTY CYCLE
000 A1
001 A2
010 A3
011 A4
100 A5
101 A6
110 A7
111 A8
EXECUTION OF S2
FIRST RANGE
EXECUTION OF S4
EXECUTION OF S5
SECOND RANGE
SELECT 2
12
INPUT/ OUTPUT CIRCUIT
SEMICONDUCTOR MEMORY
RE
RE
DQS
DQS
101
25
CONTROL SIGNAL OUTPUT CIRCUIT
26
CONTROL SIGNAL INPUT CIRCUIT
CLKI
DQSI
22
DCC CIRCUIT
DCC CONTROL CIRCUIT
DUTY CYCLE DETECTION CIRCUIT
MEMORY CONTROLLER
CC
DC
CLK
21
CLOCK GENERATION CIRCUIT
23
24

MEMORY SYSTEM

CROSS-REFERENCE TO RELATED APPLICATIONS

This application claims the benefit of and priority to Japanese Patent Application No. 2018-131546, filed Jul. 11, 2018, the entire contents of which are incorporated herein by reference.

FIELD

Embodiments described herein relate generally to a memory system.

BACKGROUND

Some memory systems include a semiconductor memory and a memory controller for controlling the semiconductor memory.

DESCRIPTION OF THE DRAWINGS

FIG. 5 shows a sub-flow of a specific step according to the first embodiment.

FIG. 6 shows a sub-flow of a specific step according to the first embodiment.

DETAILED DESCRIPTION

Figure 1:
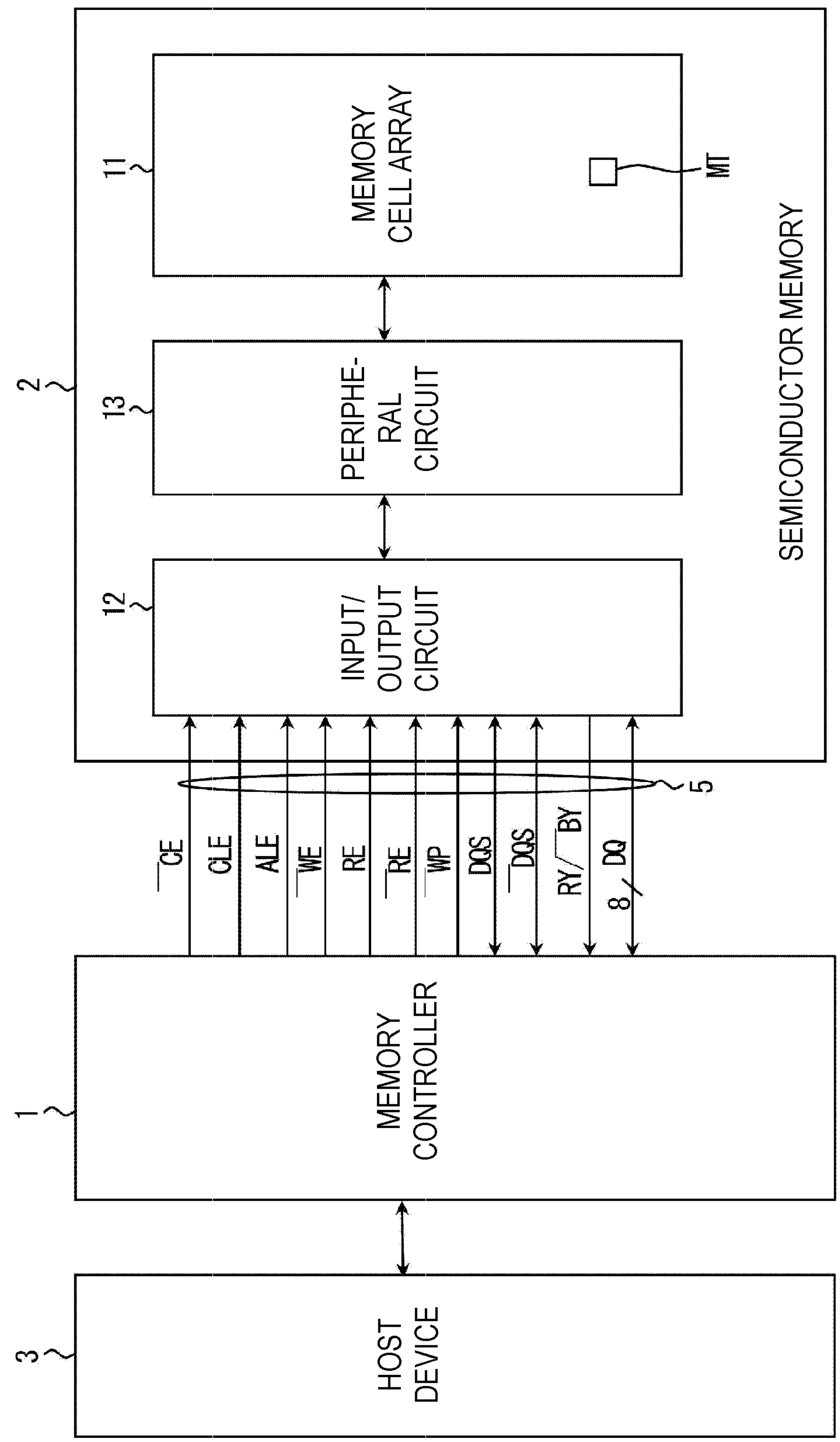
FIG. 1 shows a memory controller and related components according to a first embodiment.

Embodiments described herein provide for a high-performance memory system.

In general, according to one embodiment, a memory system may include a semiconductor memory and a memory controller. The memory controller may include an adjustment circuit configured to receive a first signal having a first duty cycle, and intermittently output a second signal to an outside of the memory controller on the basis of a control signal, the second signal having a second duty cycle which is different from the first duty cycle. The memory controller may further include a selector circuit configured to receive the second signal, receive a third signal which is generated on the basis of the second signal, and output a selected one of the second signal and the third signal. The memory controller may further include a control circuit configured to generate the control signal on the basis of the selected one of the second signal and the third signal output from the selector circuit.

Hereinafter, the embodiment will be described with reference to the accompanying drawings. In the description below, components having similar or substantially the same function and configuration may be denoted by the same reference numerals, and redundant descriptions thereof may be omitted. A description pertaining to one embodiment may be ascribed to another embodiment, unless explicitly or obviously excluded.

Each functional block may be implemented using one of or a combination of hardware and computer software. Thus, each functional block will be generally described in view of a function thereof. The functional blocks need not be distinguishable as discrete blocks in all embodiments, even when described as such herein with reference to an example embodiment. Some functions may be executed by functional blocks other than functional blocks of the example. In addition, a functional block of the example may be divided into further specified functional sub-blocks.

In the detailed description and the claims herein, when a first element is "connected" to a second element, the term "connected" encompasses configurations in which the first element is connected directly (e.g., at all times) or selectively via a conductive element, to the second element.

First Embodiment

<1-1. Structure (Configuration)>

FIG. 1 shows a memory system according to a first embodiment. The memory system includes a semiconductor memory 2 and a memory controller 1. As shown in FIG. 1, the memory controller 1 controls the semiconductor memory 2 based on, for example, an instruction from a host device 3, and may be configured as, for example, a single chip.

The semiconductor memory 2 may be configured as, for example, a single chip, and is, for example, a NAND type flash memory. The semiconductor memory 2 may be provided on, for example, a printed circuit board. The connection between the semiconductor memory 2 and the memory controller 1 may be implemented using a NAND bus 5. The NAND bus 5 transmits various signals including signals described below, and may be implemented using, for example, wiring on the printed circuit board.

The semiconductor memory 2 includes components such as a memory cell array (cell array) 11, an input/output circuit 12, and a peripheral circuit 13. The cell array 11 includes multiple memory cell transistors ("cell transistors") MT. The cell transistors MT are configured to hold or store data.

The peripheral circuit 13 includes components such as a sequencer, a driver, a sense amplifier, and a row decoder. The peripheral circuit 13 receives various signals from the input/output circuit 12, writes data to the cell transistors MT based on the received signals, and reads the data stored in the cell transistors MT.

The input/output circuit 12 is connected to the memory controller 1 via the NAND bus 5. The NAND bus 5 transmits multiple control signals and a signal DQ having a width of, for example, 8 bits. The input/output circuit 12 receives the multiple control signals from the memory controller 1 via the NAND bus 5, and supplies various internal control signals to the peripheral circuit 13 based on the received control signals. Further, the input/output circuit 12 receives write data from the memory controller 1, and supplies the received write data to the peripheral circuit 13. Further, the input/output circuit 12 receives data stored in the cell transistors MT from the peripheral circuit 13 and supplies the received data to the memory controller 1 via the NAND bus 5.

The signal DQ includes, for example, one or more of a command, write data, read data, an address, and status data. The control signals transmitted through the NAND bus 5 include signals ¯CE, CLE, ALE, ¯WE, RE, ¯RE, and ¯WP, data strobe signals DQS and ¯DQS, and a signal RY/¯BY. In this detailed description, the symbol "¯" ahead of the name of a signal indicates the inverted logic of a signal having a name lacking the symbol "¯", and means that the signal with the symbol "¯" is asserted when it is at a low level.

The asserted signal ¯CE enables the semiconductor memory 2. The asserted signal CLE notifies the semiconductor memory 2 that the signal DQ input in parallel with the signal CLE to the semiconductor memory 2 is a command. The asserted signal ALE notifies the semiconductor memory 2 that the signal DQ input in parallel with the signal ALE to the semiconductor memory 2 is an address. The asserted signal ¯WE instructs the semiconductor memory 2 to fetch the signal DQ input in parallel with the signal ¯WE to the semiconductor memory 2.

The signals RE and ¯RE instruct the semiconductor memory 2 to output the signal DQ. The signals RE and ¯RE may also be referred to as read enable signals RE and ¯RE. As described above, the read enable signals RE and ¯RE instruct the semiconductor memory 2 to output the signal DQ, and accordingly, the semiconductor memory 2 outputs the signal DQ at a timing when the memory controller 1 desires. Thus, unlike a clock signal which is always supplied, the read enable signals RE and ¯RE are intermittently output. The read enable signals RE and ¯RE are required to have duty cycles which are about 50%, or as close to 50% as possible.

The asserted signal ¯WP instructs the semiconductor memory 2 to prohibit data writing and erasing. The signal RY/¯BY indicates whether the semiconductor memory 2 is in a ready or busy state, and represents the busy state by a low level. The semiconductor memory 2 receives a command from the memory controller 1 in the ready state, and does not receive a command from the memory controller 1 in the busy state.

The data strobe signals DQS and ¯DQS directed from the memory controller 1 toward the semiconductor memory 2 instruct the timing for fetching the signal DQ to the semiconductor memory 2. The data strobe signals DQS and ¯DQS directed from the semiconductor memory 2 toward the memory controller 1 notify the memory controller 1 of the timing for fetching the signal DQ. The data strobe signals DQS and ¯DQS are required to have duty cycles which are about 50%, or as close to 50% as possible.

The input/output circuit 12 generates the data strobe signals DQS and ¯DQS based on the read enable signals RE and ¯RE, respectively. The data strobe signals DQS and ¯DQS are required to have duty cycles which are the about same as those of the read enable signals RE and ¯RE, respectively. Accordingly, the data strobe signals DQS and ¯DQS are required to have duty cycles which are about the same as those of the read enable signals RE and ¯RE, respectively, and are about 50%. However, in practice, the data strobe signals DQS and ¯DQS might have duty cycles which are different from those of the read enable signals RE and ¯RE, respectively, due to various factors including factors described below.

The NAND bus 5 might have a parasitic capacitance, and might distort the waveform shape of a received signal when transmitting a signal, due to the parasitic capacitance. Thus, the waveforms of the read enable signals RE and ¯RE might be distorted by the NAND bus 5, so that the data strobe signals DQS and ¯DQS might be generated based on the read enable signals RE and ¯RE having the distorted waveforms, and the waveforms of the data strobe signals DQS and ¯DQS might also be distorted by the NAND bus 5. Thus, the shape of the waveforms of the read enable signals RE and ¯RE output from the memory controller 1 might be different from the shape of the waveforms of the data strobe signals DQS and ¯DQS received by the memory controller 1.

Figure 2:
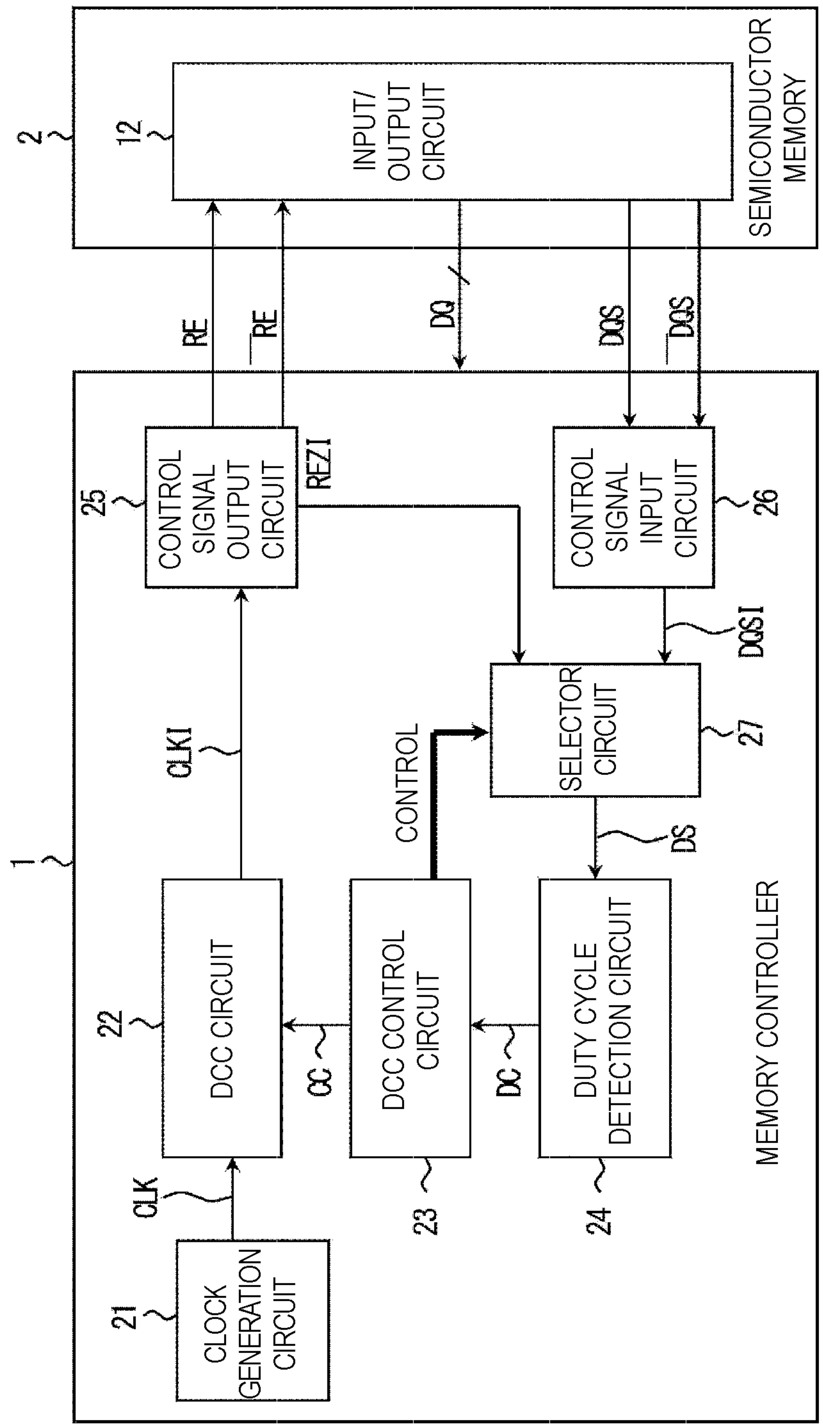
FIG. 2 shows functional blocks of the memory controller according to the first embodiment.

FIG. 2 shows functional blocks of the memory controller 1 according to the first embodiment. As illustrated in FIG. 2, the memory controller 1 includes components such as a clock generation circuit 21, a duty cycle corrector (DCC) circuit 22, a DCC control circuit 23, a duty cycle detection circuit 24, a control signal output circuit 25, a control signal input circuit 26, and a selector circuit 27.

The clock generation circuit 21 outputs a clock signal CLK having a duty cycle of about 50%. The DCC circuit 22 receives the clock signal CLK, changes the duty cycle of the clock signal CLK based on a correction code CC (which may be referred to herein as a control signal) received from the DCC control circuit 23, and outputs an internal clock signal CLKI having the changed duty cycle.

The control signal output circuit 25 receives the internal clock signal CLKI, and generates the read enable signals RE and ¯RE based on the internal clock signal CLKI. Thus the control signal output circuit 25 generates the read enable signals RE and ¯RE which are the about same in duty cycle and phase as the internal clock signal CLKI. For example, the read enable signal RE is generated to have an amplitude which is the same or substantially the same as that of the internal clock signal CLKI, and to have a duty cycle which is substantially the same as that of the internal clock signal CLKI. The read enable signal RE may be the same or substantially the same as the internal clock signal CLKI. The control signal output circuit 25 may generate a signal REZI based on the read enable signal RE or ¯RE. For example, the signal REZI may have an amplitude which is the same or substantially the same as that of the read enable signal RE or ¯RE, and may have a duty cycle which is the same or substantially same as that of the read enable signal RE or ¯RE.

The control signal input circuit 26 receives the data strobe signals DQS and ¯DQS. The control signal input circuit 26 supplies the data strobe signals DQS and ¯DQS to a circuit (not shown) such as a data input circuit. The data input circuit fetches the signal DQ based on the data strobe signals DQS and ¯DQS. Further, the control signal input circuit 26 generates an internal data strobe signal DQSI based on the data strobe signals DQS and ¯DQS. For example, the internal data strobe signal DQSI is generated to have an amplitude which is about the same as that of the data strobe signals DQS and ¯DQS, and to have a duty cycle which is substantially the same as that of the data strobe signals DQS and ¯DQS. The internal data strobe signal DQSI may be the same or substantially the same as the data strobe signal DQS.

The selector circuit 27 receives the signal REZI from the control signal output circuit 25, and also receives the internal data strobe signal DQSI from the control signal input circuit 26. Then, under the control of the DCC control circuit 23, the selector circuit 27 outputs the signal REZI or the internal data strobe signal DQSI as a detection target signal DS.

The duty cycle detection circuit 24 receives the detection target signal DS, and detects the duty cycle of the detection target signal DS. The detection of the duty cycle may be performed using any appropriate method, and the present embodiment is not limited by the detection method. The duty cycle detection circuit 24 generates a detection code DC based on the detected duty cycle of the detection target signal DS. The detection code DC has, for example, multiple bits, represents various values according to a combination of values of the bits and represents information about the duty cycle of the detection target signal DS.

The DCC control circuit 23 receives the detection code DC, and generates a correction code CC by referring to the detection code DC. The correction code CC may be output to the DCC circuit 22.

<1-2. Operation>

<1-2-1. Operations of the DCC Control Circuit and the DCC Circuit>

Figures 3, 4:
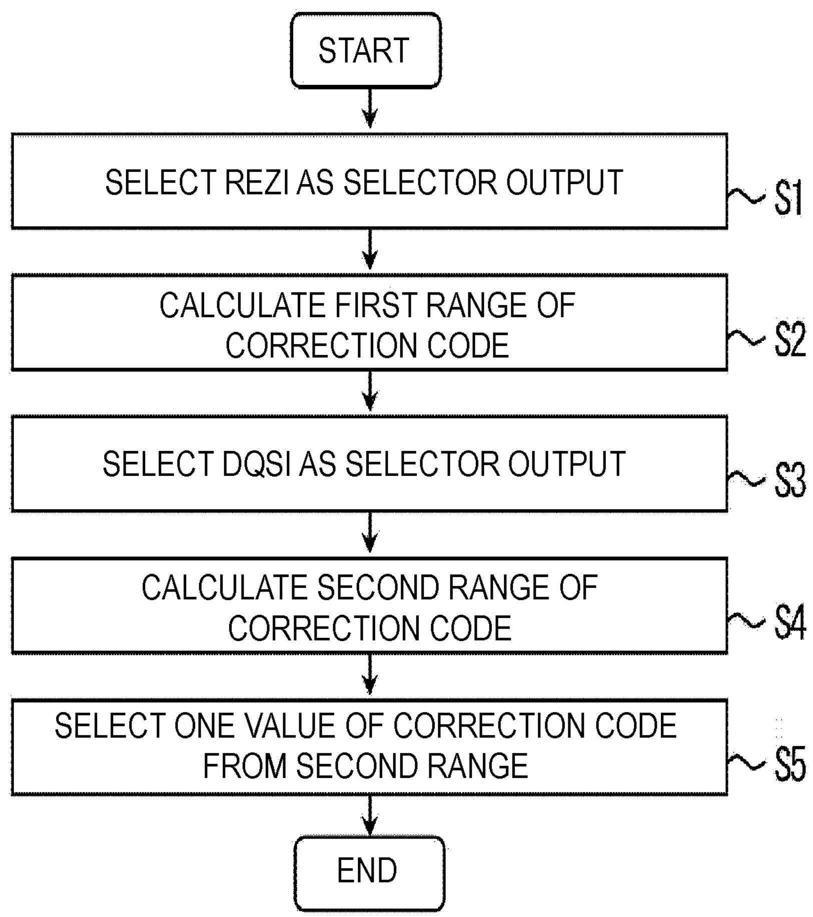
FIG. 3 shows a relationship between values of a correction code and information indicated by each value according to the first embodiment.
FIG. 4 shows a flow of an operation of the memory controller according to the first embodiment.

FIG. 3 shows an example relationship between multiple values of the correction code CC generated by the DCC control circuit 23 and information indicated by each value according to the first embodiment. FIG. 3 represents an example where the correction code CC has three bits. As shown in FIG. 3, the multiple different values of the correction code CC indicate different pieces of information, and instruct an adjustment of different amounts on duty cycles. For example, the values 000, 001, 010, 011, 100, 101, 110, and 111 represent adjustment amounts of duty cycles which correspond to the values A1, A2, A3, A4, A5, A6, A7, and A8, respectively. The values A1, A2, A3, A4, A5, A6, A7, and A8 are different from each other, and may be zero or positive or negative values.

The DCC circuit 22 (also referred to herein as an "adjustment circuit") adjusts the duty cycle of the clock signal CLK by a value corresponding to the value of the received correction code CC, and continues to output the internal clock signal CLKI having a duty cycle obtained as a result of the adjustment.

<1-2-2. Operation to Adjust the Duty Cycles of the Read Enable Signals RE and $\overline{\text{RE}}$>

FIG. 4 shows the flow of the operation of the memory controller 1 according to the first embodiment, and also represents the flow for adjusting the duty cycles of, in particular, the signal REZI, and furthermore, the read enable signals RE and $\overline{\text{RE}}$. Several steps will be described in detail later.

The flow of FIG. 4 is performed, for example, after the power starts to be supplied to the memory controller 1 and before the memory controller 1 performs an access to the semiconductor memory 2 (e.g., data reading). The flow of FIG. 4 may be performed as a part of a procedure for enabling the memory controller 1 to access the semiconductor memory 2.

As illustrated in FIG. 4, the DCC control circuit 23 selects the signal REZI as an output from the selector circuit 27 (step S1). As a result of the selection, the detection target signal DS is the signal REZI until the output from the selector circuit 27 is switched to a next output. In the descriptions below, the signal REZI may be used to refer to the detection target signal DS.

At the time of step S1, the DCC circuit 22 is in the default state, and need not adjust the duty cycle of the clock signal CLK. Thus, the internal clock signal CLKI has a duty cycle which is substantially the same as the duty cycle of the clock signal CLK, and has, for example, the duty cycle of about 50%.

In addition, during the execution of steps S1 and S2, the duty cycle detection circuit 24 sequentially detects the duty cycle of the signal REZI (as the detection target signal DS), and sequentially outputs a detection code DC corresponding to a value based on the detected duty cycle.

In step S2, the DCC control circuit 23 calculates a range of the values of the correction code CC in which the duty cycles of the REZI signal fall within a first specific region, for example, a region of about 45% or more and less than about 55%. In the descriptions herein below, the range calculated in step S2 will be referred to as a first range. In order to calculate the first range, for example, the DCC control circuit 23 sequentially changes the values of the correction code CC while monitoring the value of the detection code DC. According to the change of the values of the correction code CC, the duty cycle of the internal clock signal CLKI, and accordingly, the duty cycles of the read enable signals RE and $\overline{\text{RE}}$ and the signal REZI change. Thus, during step S2, the DCC control circuit 23 may determine the values of the correction code CC when the internal clock signal CLKI has a specific width of duty cycle, and accordingly, when the read enable signals RE and $\overline{\text{RE}}$ and the signal REZI have a specific width of duty cycles. The calculation of the first range may be performed using any appropriate method, and an example of the method will be described later.

In step S3, the DCC control circuit 23 selects the internal data strobe signal DQSI as an output from the selector circuit 27. As a result of the selection, the detection target signal DS is now the internal data strobe signal DQSI until the output of a signal by the selector circuit 27 is switched to the next output. In the descriptions herein below, the internal data strobe signal DQSI may be used to refer to the detection target signal DS.

In step S4, the DCC control circuit 23 calculates a range of the values of the correction code CC in which the duty cycle of the internal data strobe signal DQSI falls within a second specific region, for example, a region of about 45% or more and less than about 55%. In the descriptions herein below, the range calculated in step S4 will be referred to as a second range. In order to calculate the second range, for example, the DCC control circuit 23 sequentially changes the values of the correction code CC while monitoring the value of the detection code DC. According to the change of the values of the correction code CC, the duty cycle of the internal clock signal CLKI, and accordingly, the duty cycle of the internal data strobe signal DQSI change. Thus, during step S4, the DCC control circuit 23 may determine the values of the correction code CC which correspond to the width of the duty cycle of the internal clock signal CLKI, and accordingly, the width of the duty cycle of the internal data strobe signal DQSI. The calculation of the second range may be performed using any appropriate method, and an example of the method will be described later.

In step S5, the DCC control circuit 23 selects one value from the second range calculated in step S4, and continues to use the selected value. As a result, the internal clock signal CLKI continues to have the duty cycle based on the selected value.

<1-2-3. Example of the Details of Step S2>

FIG. 5 shows a sub-flow of step S2 according to the first embodiment. As shown in FIG. 5, step S1 is followed by step S21. In other embodiments, steps (including step S1 and step S2) need not be performed in the depicted or described order, and certain steps may be reordered or performed in parallel. In step S21, the DCC control circuit 23 selects one of the unselected values of the correction code CC, and supplies the correction code CC having the selected value to the DCC circuit 22. Thus the duty cycle of the detection target signal DS (here, the signal REZI) has the width based on the correction code CC having the value selected in step S21.

In step S22, by using the detection code DC, the DCC control circuit 23 determines whether the duty cycle of the signal REZI is within a first region of duty cycle values (e.g., the region of about 45% or more and less than about 55%). When it is determined that the duty cycle of the signal REZI is within the first region ("Yes" branch of step S22), the process proceeds to step S23. In step S23, the DCC control circuit 23 determines to incorporate the currently selected value of the correction code CC into the first range. Meanwhile, when it is determined that the duty cycle of the signal REZI is not within the first region ("No" branch of step S22), the process proceeds to step S24. In step S24, the DCC control circuit 23 determines not to incorporate the currently selected value of the correction code CC into the first range.

Both of steps S23 and S24 proceed to step S25. In step S25, the DCC control circuit 23 determines whether all of the values of the correction code CC have been selected. When it is determined that all of the values have not been selected ("No" branch of step S25), the process returns to step S21. When it is determined that all of the values have been selected ("Yes" branch of step S25), the process proceeds to step S3. Thus the first range of the values of the correction code CC may be obtained.

Depending on the values of the correction code CC, not all of the values of the correction code CC need be selected in step S21, and one or more may be omitted. For example, in a case where specific values Am and Am+1 (m is a natural number) of the correction code CC are determined such that the duty cycle of the internal clock signal CLKI becomes large in order of the values Am and Am+1, when the duty cycle of the signal REZI with the correction code CC of the value Am has a width equal to or more than the upper limit of the first region (e.g., 55%), the value Am+1 does not need to be selected, and thus, may be excluded from the first range. Similarly, in a case where specific values Ap and Ap−1 (p is a natural number) of the correction code CC are determined such that the duty cycle of the internal clock signal CLKI becomes small in order of the values Ap and Ap−1, when the duty cycle of the signal REZI with the correction code CC of the value Ap has a width less than the lower limit of the first region (e.g., about 45%), the value Ap−1 does not need to be selected, and thus, may be excluded from the first range.

<1-2-4. Example of the Details of Step S4>

FIG. 6 shows the sub-flow of step S4 according to the first embodiment. The flow of FIG. 6 is similar to the flow of FIG. 5. As shown in FIG. 6, step S3 proceeds to step S41.

In step S41, the DCC control circuit 23 selects one of the unselected values of the values in the first range of the correction code CC, and supplies the correction code CC having the selected value to the DCC circuit 22. Thus the duty cycle of the detection target signal DS (here, the internal data strobe signal DQSI) has a width based on the correction code CC having the value selected in step S41.

In step S42, by using the detection code DC, the DCC control circuit 23 determines whether the duty cycle of the internal data strobe signal DQSI is within a second region (e.g., the region of about 45% or more and less than about 55%). When it is determined that the duty cycle of the internal data strobe signal DQSI is within the second region ("Yes" branch of step S42), the process proceeds to step S43. In step S43, the DCC control circuit 23 determines to incorporate the currently selected value of the correction code CC into the second range. Meanwhile, when it is determined that the duty cycle of the internal data strobe signal DQSI is not within the second region ("No" branch of step S42), the process proceeds to step S44. In step S44, the DCC control circuit 23 determines not to incorporate the currently selected value of the correction code CC into the second range.

Both of steps S43 and S44 proceed to step S45. In step S45, the DCC control circuit 23 determines whether all of the values in the first range of the correction code CC have been selected. When it is determined that all of the values have not been selected ("No" branch of step S45), the process returns to step S41. When it is determined that all of the values have been selected ("Yes" branch of step S45), the process proceeds to step S5. Thus the second range of the values of the correction code CC may be obtained.

As in the case of determining the first range, depending on the values of the correction code CC, all of the values in the first range need not be selected in step S41, and one or more may be omitted. For example, in a case where specific values Am and Am+1 of the correction code CC are determined such that the duty cycle of the internal clock signal CLKI becomes large in order of the values Am and Am+1, when the duty cycle of the internal data strobe signal DQSI with the correction code CC of the value Am has a width equal to or more than the upper limit of the second region (e.g., 55%), the value Am+1 does not need to be selected, and thus, may be excluded from the second range. Similarly, in a case where specific values Ap and Ap−1 of the correction code CC are determined such that the duty cycle of the internal clock signal CLKI becomes small in order of the values Ap and Ap−1, when the duty cycle of the internal data strobe signal DQSI with the correction code CC of the value Ap has a width less than the lower limit of the second region (e.g., about 45%), the value Ap−1 does not need to be selected, and thus, may be excluded from the second range.

<1-2-5. Example of the Transition of the Range of the Values of the Correction Code and the Details of Step S5>

Figure 7:
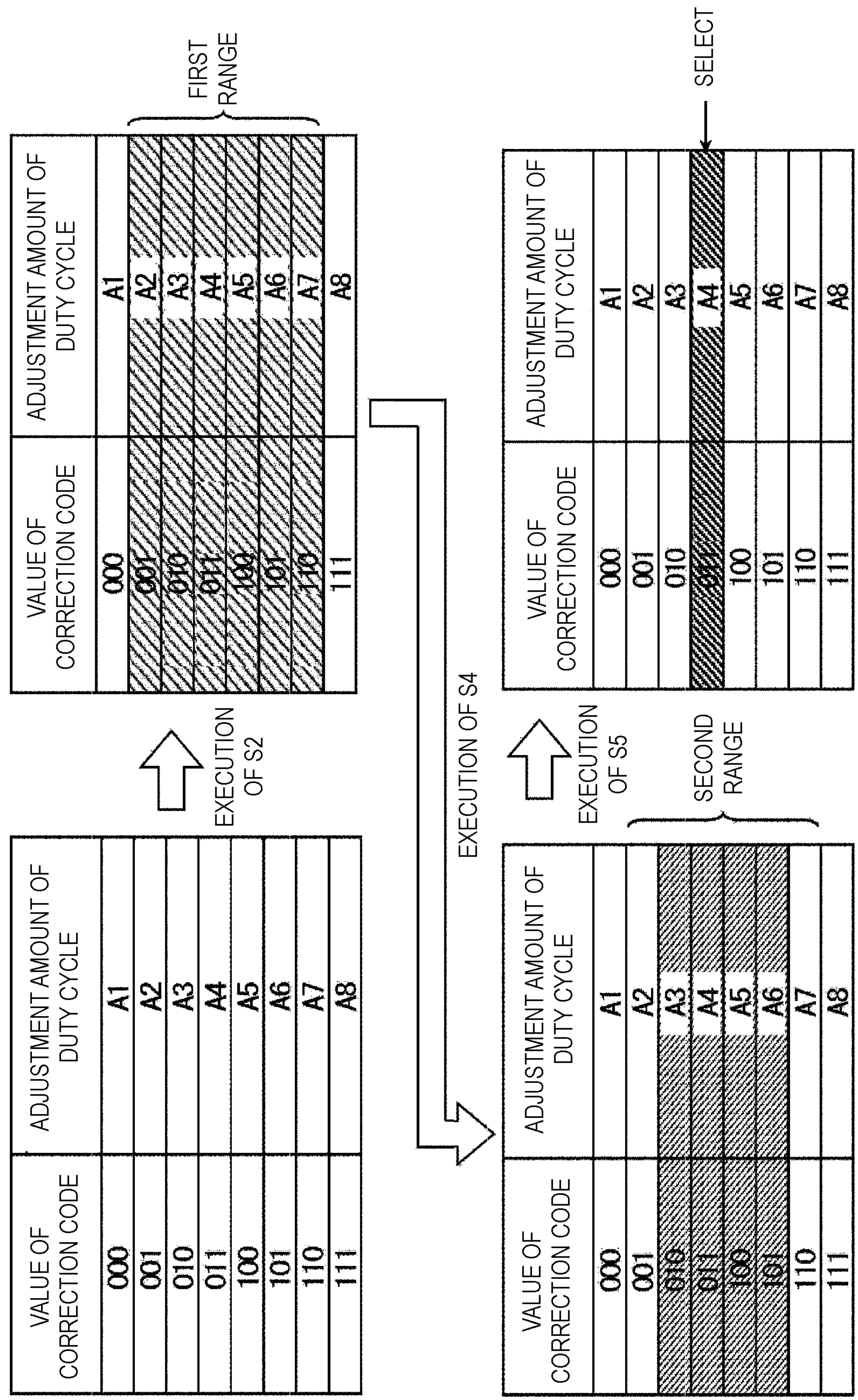
FIG. 7 shows a transition of a range of values of a correction code among several steps according to the first embodiment.

FIG. 7 shows the transition of the range of the values of the correction code CC among steps S2, S4, and S5 according to the first embodiment. As shown in FIG. 7, in the stage of step S1 (the table at the upper left portion of FIG. 7), the range in which the values of the correction code CC can be selected includes all of the values of the correction code CC.

The first range of the values of the correction code CC is calculated upon the completion of step S2, and the range in which the values of the correction code CC can be selected is narrowed to the first range. In the example of FIG. 7, the first range includes 001 to 110, that is, 001, 010, 011, 100, 101, and 110.

Similarly, the second range of the values of the correction code CC is calculated upon the completion of step S4, and the range in which the values of the correction code CC can be selected is narrowed to the second range. In the example of FIG. 7, the second range includes 010 to 101, that is, 010, 011, 100, and 101.

In step S5, the DCC control circuit 23 selects a value of the correction code CC from the second range. For example, the DCC control circuit 23 may select a value present in the center of the second range. In the example of FIG. 7, 011 or 100 may be selected and, for example, 011 is selected. The selected value may be used as a default value until a next adjustment process.

<1-3. Advantages (Effects)>

According to the first embodiment, a memory controller may be implemented which is capable of, amongst other things, obtaining the data strobe signal DQS having an improved duty cycle while satisfying specifications imposed to the read enable signals RE and $\overline{RE}$. Details are described below.

Figure 8:
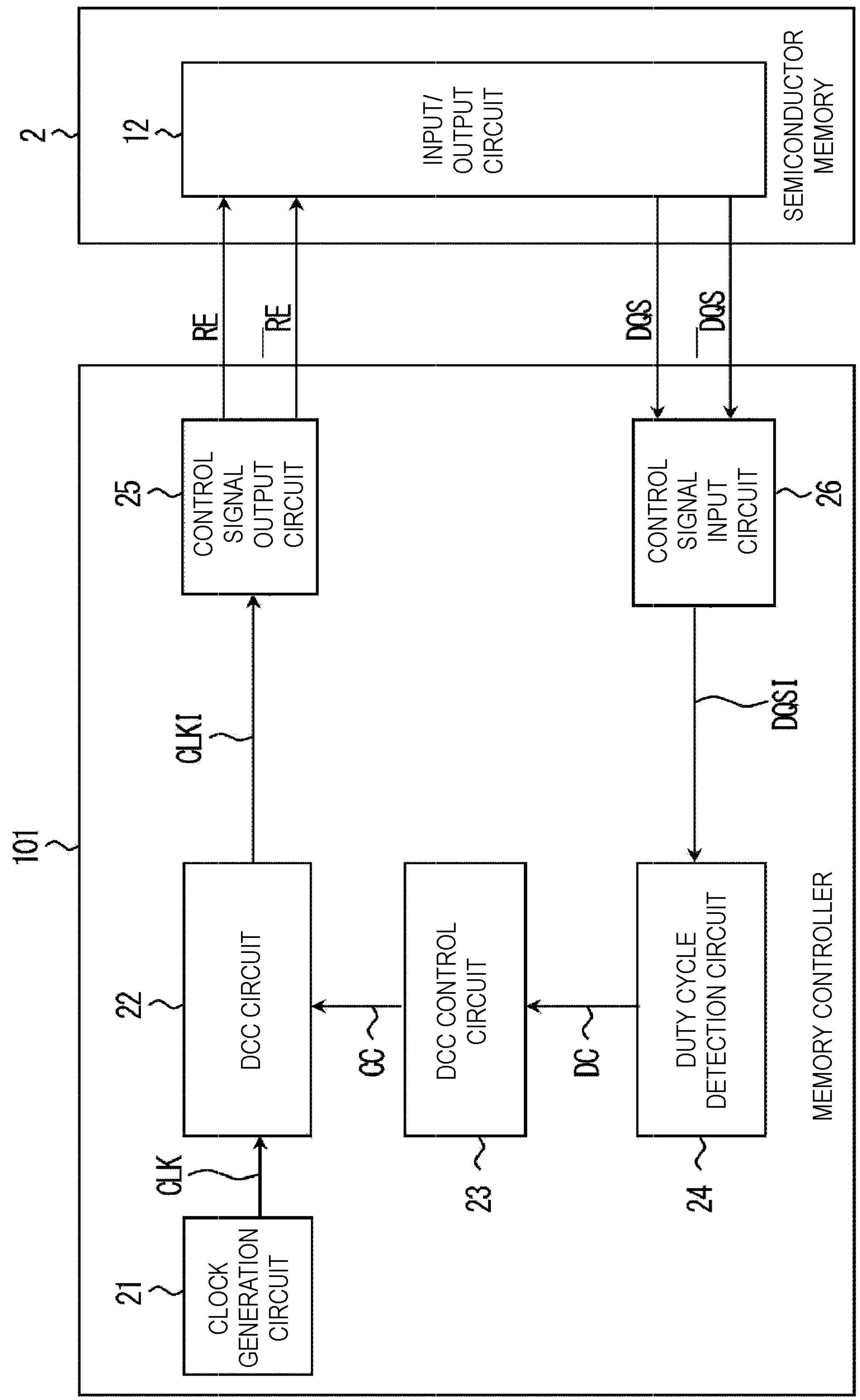
FIG. 8 shows functional blocks of a memory controller of a comparative example.

FIG. 8 shows functional blocks of a memory controller 101 of a comparative example. The memory controller 101 does not include the selector circuit 27. Accordingly, the internal data strobe signal DQSI is directly supplied to the duty cycle detection circuit 24.

As described above, the duty cycles of the read enable signals RE and $\overline{RE}$ should fall within the first region to meet certain specifications, and the duty cycle of the data strobe signal DQS also should fall within the second region to meet certain specifications. In particular, the data strobe signal DQS should be close to the duty cycle of about 50% to meet the certain specifications.

Figure 9:
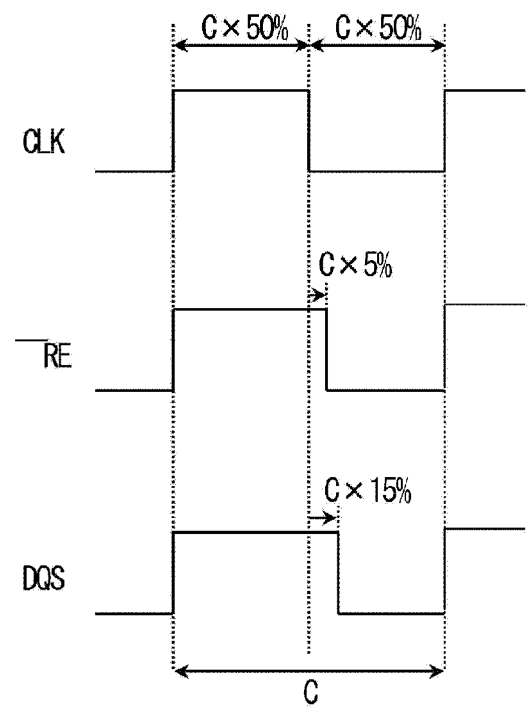
FIG. 9 shows waveforms of several signals in a specific case of the comparative example.
Figure 10:
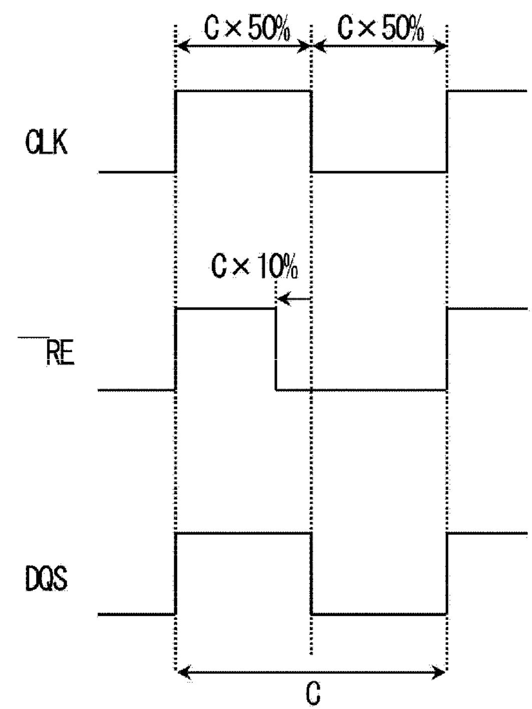
FIG. 10 shows waveforms of several signals in another case of the comparative example.

Each of FIGS. 9 and 10 shows, according to the comparative example, waveforms of the clock signal CLK in the memory controller 101, the read enable signal $\overline{RE}$ based on the internal clock signal CLKI adjusted to a specific duty cycle, and the corresponding data strobe signal DQS (substantially equal to the internal data strobe signal DQSI). FIG. 9 shows a case where the duty cycle of the read enable signal $\overline{RE}$ falls within the first region, for example, falls within 50±5%, and FIG. 10 shows a case where the duty cycle of the data strobe signal DQS falls within the second region, for example, falls within 50±5%.

As described above, the data strobe signals DQS and $\overline{DQS}$ are generated based on the read enable signals RE and $\overline{RE}$, aiming to have a duty cycle which is about the same as that of the read enable signals RE and $\overline{RE}$ or similar to that of the read enable signals RE and $\overline{RE}$ and close to 50%. However, the waveforms of the read enable signals RE and $\overline{RE}$ output from the control signal output circuit 25 may be different from those of the data strobe signals DQS and $\overline{DQS}$ received by the control signal input circuit 26, due to, for example, the parasitic capacitance of the NAND bus 5 and/or the parasitic capacitance of the wiring path in the semiconductor memory 2. Thus, as shown in FIG. 9, even though the duty cycle of the internal clock signal CLKI is adjusted such that the duty cycle of the read enable signal $\overline{RE}$ falls within the first region, the duty cycle of the data strobe signal DQS with the internal clock signal CLKI having the adjusted duty cycle might not fall within the second region.

Meanwhile, as shown in FIG. 10, even though the duty cycle of the internal clock signal CLKI is adjusted such that the duty cycle of the data strobe signal DQS falls within the second region, the duty cycle of the read enable signal $\overline{RE}$ with the internal clock signal CLKI having the adjusted duty cycle might not fall within the first region. In particular, when the duty cycle of the data strobe signal DQS is made close to 50% in a case where the read enable signal $\overline{RE}$ has a high frequency of, for example, several hundred Mbps, the duty cycle of the read enable signal $\overline{RE}$ might not frequently fall within the first region.

According to the first embodiment, the memory controller 1 determines the first range of the values of the correction code CC with which the duty cycles of the read enable signals RE and $\overline{RE}$ fall within the first region, determines, based on the first range, the second range of the values of the correction code CC with which the duty cycle of the data strobe signal DQS falls within the second region, and selects one value from the second range. Thus, the memory controller 1 can generate the internal clock signal CLKI with which the duty cycles of the read enable signals RE and $\overline{RE}$ fall within the first region, and the duty cycle of the data strobe signal DQS falls within the second region.

As used herein, the terms "about," "approximately," and "substantially" are used to describe and account for small variations. When used in conjunction with an event or circumstance, the terms "about," "approximately," and "substantially" can refer to instances in which the event or circumstance occurs precisely as well as instances in which the event or circumstance occurs to a close approximation. For example, when used in conjunction with a numerical value, the terms "about," "approximately," and "substantially" can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

While certain embodiments have been described, these embodiments have been presented by way of example only, and are not intended to limit the scope of the present disclosure. Indeed, the embodiments described herein may be embodied in a variety of other forms; furthermore, various omissions, substitutions and changes in the form of the embodiments described herein may be made without departing from the spirit of the present disclosure. The accompanying claims and their equivalents are intended to cover such forms or modifications as would fall within the scope and spirit of the present disclosure.

What is claimed is:

1. A memory system comprising:

a semiconductor memory; and a memory controller including:

an adjustment circuit configured to receive a first signal having a first duty cycle, generate a second signal on the basis of the first signal and a control signal, the second signal having a second duty cycle which is different from the first duty cycle, and intermittently output the second signal to an outside of the memory controller;

a selector circuit configured to receive a third signal and a fourth signal which are generated on the basis of the second signal, and output a detection target signal on the basis of a selected one of the third signal and the fourth signal; and a control circuit configured to generate the control signal on the basis of the detection target signal.

2. The memory system according to claim 1, wherein the adjustment circuit is configured to change the second duty cycle on the basis of the control signal.

3. The memory system according to claim 1, wherein the memory controller is further configured to receive a data signal in accordance with a timing of the fourth signal.

4. The memory system according to claim 1, wherein the second signal instructs a device that receives the intermittently output second signal to output a data signal.

5. The memory system according to claim 1, wherein the control circuit is further configured to detect a duty cycle of the selected one of the third signal and the signal, and generate the control signal on the basis of the detected duty cycle.

6. The memory system according to claim 1, wherein the memory controller is further configured to supply the intermittently output second signal to the semiconductor memory, and receive a signal that generates the fourth signal from the semiconductor memory.

7. The memory system according to claim 1, wherein the control circuit is configured to determine whether the second duty cycle signal falls within a first predetermined range while the selector circuit outputs the detection target signal.

8. The memory system according to claim 7, wherein the control circuit is configured to apply a correction code to the adjustment circuit while the selector circuit outputs the detection target signal.

9. The memory system according to claim 8, wherein the control circuit is configured to apply a plurality of correction codes to the adjustment circuit while the selector circuit outputs the detection target signal, and determine for which of the plurality of correction codes the second duty cycle falls within the first predetermined range.

10. The memory system according to claim 9, wherein the control circuit is configured to determine whether a duty cycle of the fourth signal falls within a second predetermined range while the selector circuit outputs the detection target signal.

11. The memory system according to claim 10, wherein the control circuit is configured to apply a correction code to the adjustment circuit while the selector circuit outputs the detection target signal.

12. The memory system according to claim 11, wherein the control circuit is configured to apply a plurality of correction codes to the adjustment circuit while the selector circuit outputs the detection target signal, and determine for which of the plurality of correction codes the duty cycle of the fourth signal falls within the second predetermined range.

13. A method for implementing a control signal for a memory controller that includes an adjustment circuit, a selector circuit, and a control circuit, the method comprising:

receiving, by the adjustment circuit, a first signal having a first duty cycle, and intermittently outputting a second signal to an outside of the memory controller on the basis of a control signal, the second signal having a second duty cycle which is different from the first duty cycle;

receiving, by the selector circuit, a third signal and a fourth signal which are generated on the basis of the second signal;

outputting, by the selector circuit, a detection target signal on the basis of a selected one of the third signal and the fourth signal to the control circuit; and supplying, by the control circuit, a correction code for changing the second duty cycle to the adjustment circuit on the basis of the selected one of the third signal and the fourth signal.

14. The method according to claim 13, further comprising determining, by the control circuit, whether the second duty cycle falls within a predetermined range while the selector circuit outputs the detection target signal.

15. The method according to claim 14, further comprising supplying, by the control circuit, a plurality of correction codes to the adjustment circuit while the selector circuit outputs the detection target signal, and determining for which of the plurality of correction codes the second duty cycle falls within the predetermined range.

16. The method according to claim 15, further comprising selecting, by the adjustment circuit, one of the correction codes for which the second duty cycle falls within the predetermined range as a default value.

17. The method according to claim 15, wherein the predetermined range is between 45% and 55%.

18. The method according to claim 13, further comprising determining, by the control circuit, whether a third duty cycle of the fourth signal falls within a predetermined range while the selector circuit outputs the detection target signal.

19. The method according to claim 18, further comprising supplying, by the control circuit, a plurality of correction codes to the adjustment circuit while the selector circuit outputs the detection target signal, and determining for which of the plurality of correction codes the third duty cycle falls within the predetermined range.

20. The method according to claim 19, further comprising selecting, by the adjustment circuit, one of the correction codes for which the third duty cycle falls within the predetermined range as a default value.

* * * * *